(12) United States Patent
Garnier

(10) Patent No.: US 6,505,739 B2
(45) Date of Patent: Jan. 14, 2003

(54) CARTON AND CARTON BLANK

(75) Inventor: Jean-Michel Garnier, Issoudun (FR)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/839,703

(22) Filed: Apr. 22, 2001

(65) Prior Publication Data
US 2001/0037952 A1 Nov. 8, 2001

Related U.S. Application Data

(63) Continuation of application No. PCT/US99/24513, filed on Oct. 19, 1999.

(51) Int. Cl.$^7$ ............................................. B65D 85/57
(52) U.S. Cl. .................. 206/312; 206/308.1; 206/232; 229/72
(58) Field of Search .............................. 206/312, 308.1, 206/307, 309, 311, 313, 232, 472, 775, 782; 283/56; 281/31; 229/72, 75, 68.1

(56) References Cited

U.S. PATENT DOCUMENTS

| 3,688,898 A | | 9/1972 | Stanton ........................ 206/311 |
| 3,717,297 A | | 2/1973 | Perry ............................ 229/72 |
| 3,719,319 A | | 3/1973 | Schleutermann et al. ..... 229/72 |
| 3,826,360 A | * | 7/1974 | Shore ........................... 229/72 |
| 3,870,223 A | | 3/1975 | Wyant .......................... 229/72 |
| 4,473,153 A | * | 9/1984 | Colangelo ..................... 206/312 |
| 4,709,812 A | | 12/1987 | Kosterka .................. 206/308.1 |
| 4,852,740 A | | 8/1989 | Sellar et al. ............. 206/308.3 |
| 5,188,229 A | | 2/1993 | Bernstein .................. 206/308.1 |
| 5,318,222 A | | 6/1994 | Bartlett ......................... 229/72 |
| 5,450,953 A | * | 9/1995 | Reisman ...................... 206/310 |
| 5,638,953 A | | 6/1997 | House ...................... 206/308.1 |
| 5,690,219 A | * | 11/1997 | Harrer ..................... 206/308.1 |

FOREIGN PATENT DOCUMENTS

| DE | 317786 | 12/1919 |
| DE | 555632 | 7/1932 |
| DE | 295 09 553 U1 | 8/1995 |
| EP | 0 614 189 A1 | 9/1994 |
| GB | 1174508 | 12/1969 |
| WO | 95/35571 | 12/1995 |
| WO | 98/22370 | 5/1998 |

* cited by examiner

Primary Examiner—Mickey Yu
Assistant Examiner—Jila M. Mohandesi
(74) Attorney, Agent, or Firm—Tsugihiko Suzuki

(57) ABSTRACT

A sleeve and a blank for forming a sleeve for holding information discs, for example compact discs or the like includes a back panel, a partition panel foldably connected to one of the side edges of the back panel, and a front panel foldably connected to the bottom edge of the back panel. The partition panel is folded and disposed over the back panel to define a first disc pocket between the back panel and the partition panel. The front panel is folded and disposed over the partition panel to define a second disc pocket between the partition panel and the front panel as well as to provide a closed bottom for both the first and second disc pockets.

6 Claims, 4 Drawing Sheets

CARTON AND CARTON BLANK

This is a continuation of international application No. PCT/US99/24513, filed Oct. 19, 1999, which is hereby incorporated by reference.

BACKGROUND OF THE INVENTION

The invention relates to a carton or sleeve for accommodating articles, for example information discs or the like, formed from one or more blanks of paperboard or other suitable foldable sheet material and more particularly to a sleeve capable of being formed into a sealed compartment comprising two or more disc pockets.

Examples of sleeves formed from one or more blanks of cardboard may be found in U.S. Pat. No. 3,719,319 which illustrates an envelope like container made of a single blank comprising one or more open topped pockets formed from three panels foldably connected in series. The bottom of the sleeve is formed by a flap secured to one of the outer panels by glue. Other examples illustrated in U.S. Pat. No. 3,717,297 and U.S. Pat. No. 3,688,898. However, the gluing and folding process of known sleeves is relatively complex and slow.

SUMMARY OF THE INVENTION

The present invention and its preferred embodiments seek to overcome or at least mitigate the problems of the prior art.

According to the first aspect of the invention there is provided a sleeve for holding information discs, for example compact discs or the like. The sleeve comprises a back panel, a partition panel foldably connected to one of the opposite side edges of the back panel, and a front panel foldably connected to the bottom edge of the back panel. The partition panel is folded and disposed over the back panel to define a first disc pocket between the back panel and the partition panel while the front panel is folded and disposed over the partition panel to define a second disc pocket between the partition panel and the front panel. This arrangement provides an envelope having two or more disc pockets and a closed bottom. Preferably, the front panel further comprises securing flaps foldably connected respectively to the opposite side edges of the front panel to secure the front panel to the back panel.

According to an optional feature of the first aspect of the invention, at least one of the front or back panels may comprise a recess opening to the top edge thereof to allow a user access to a disc contained in the sleeve.

According to another optional feature of this aspect of the invention, there may be a protrusion extending from the partition panel to protect a disc contained in the sleeve.

According to yet another optional feature of this aspect of the invention, a second partition panel may be foldably connected to the other side edge of the back panel. The second partition panel may be disposed between the first partition panel and the front panel to form a third disc pocket between the first and second partition panels.

A second aspect of the invention provides a blank for forming a sleeve for holding information discs, for example compact discs or the like. The blank may comprise a back panel, a partition panel foldably connected to one of the opposite side edges of the back panel, a front panel foldably connected to a bottom edge of the back panel, and a pair of securing flaps hingedly connected to the opposite side edges of the front panel.

A third aspect of the invention provides a method of forming a sleeve with two or more disc pockets from a blank. The blank comprises a back panel, a partition panel foldably connected to one of the side edges of the back panel, a front panel foldably connected to the bottom edge of the back panel, and a pair of securing flaps hingedly connected respectively to the opposite side edges of the front panel. The method comprises the steps of (i) folding the partition panel into face contacting arrangement with the back panel; (ii) folding the front panel into face contacting arrangement with the partition panel; and (iii) securing the front and back panels together by means of the securing flaps. The securing step may comprise applying glue to the securing flap, and folding the securing flaps into face contacting arrangement with the outside surface of the back panel.

BRIEF DESCRIPTION OF THE DRAWINGS

Exemplary embodiments of the invention will now be described, by way of example only, with reference to the accompanying drawings in which.

DETAILED DESCRIPTION OF THE PREFERRED EMBODIMENT

Figure 1:
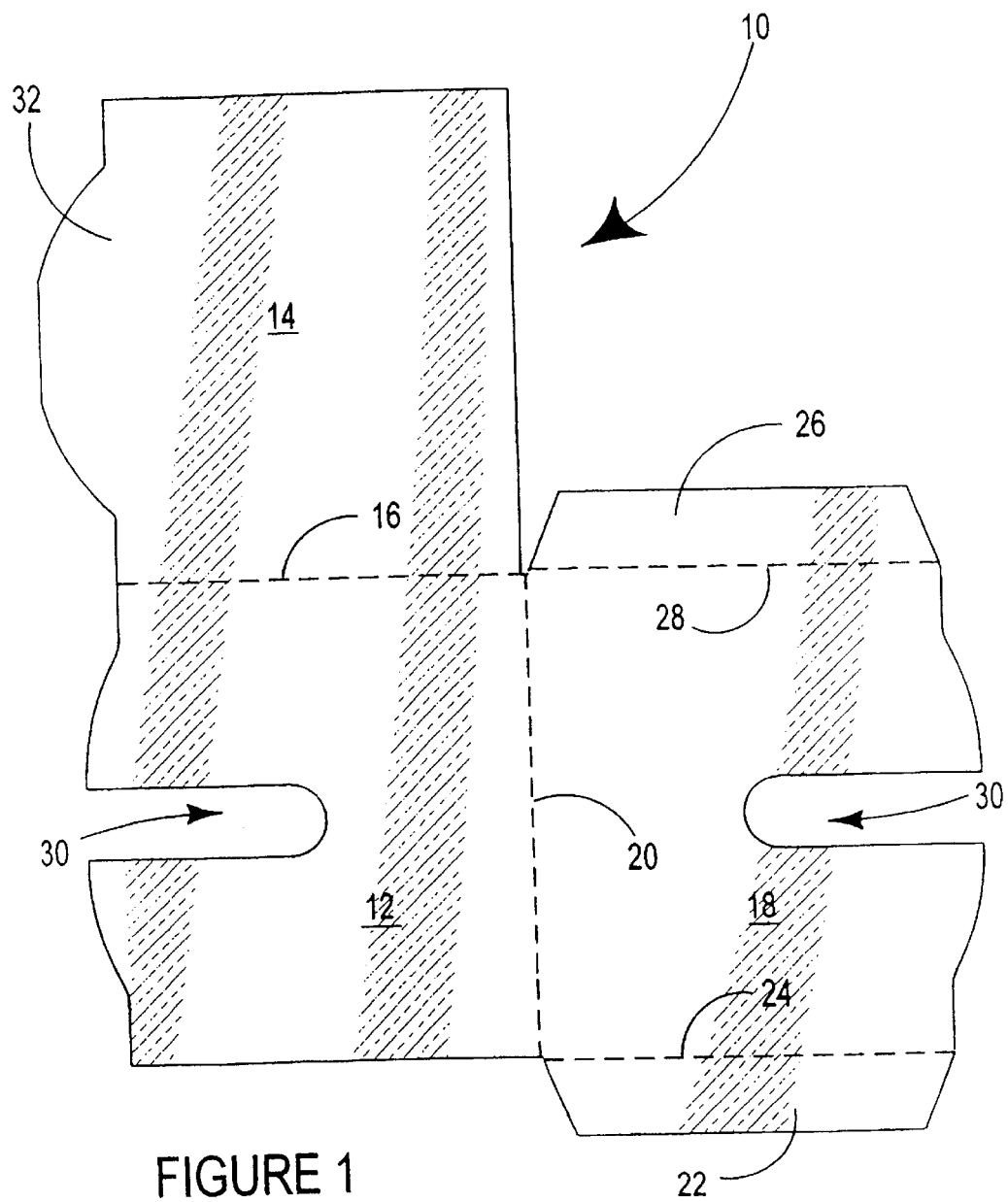
FIG. 1 is a plan view of a blank for forming a sleeve according to a preferred embodiment of the invention.

Referring first to FIG. 1, there is shown a blank 10 for forming a carton (or sleeve) for holding a plurality of articles, for example information discs and the like made from one or more blanks of paperboard or similar foldable sheet material. The blank 10 comprises a back panel 12, a partition panel 14 foldably connected to a side edge of back panel 12 along fold line 16. There further comprises a front panel 18 foldably connected to back panel 12, preferably at its bottom edge, along fold line 20.

Securing means is provided to secure the panels together: in this embodiment, the securing means comprises a pair of side flaps 22, 26 foldably connected to the opposed side edges of front panel 18 along fold lines 24 and 28 respectively.

The back and/or front panels 12, 18 may optionally comprise one or more recesses 30 to allow a user to access to a disc contained in the sleeve when in use. There may further comprise a protruding portion 32 extending upwardly from an upper part of divider panel 14. In use, the protrusion 32 extends beyond the or each disc contained in the sleeve to provide support and to protect the discs should the sleeve be accidentally dropped. The front and/or back panels 12, 18 may also be provided with a protruding portion.

It is envisaged that a second divider panel (not shown) could be provided along the opposing side edge of back panel 12 opposite fold line 16 to provide a further disc pocket if required. Furthermore, the size of sleeve can be altered according to manufacturing or user requirements. For example, the height or width of the panels can be increased or decreased according to the size of article to be held by the sleeve.

Figure 2:
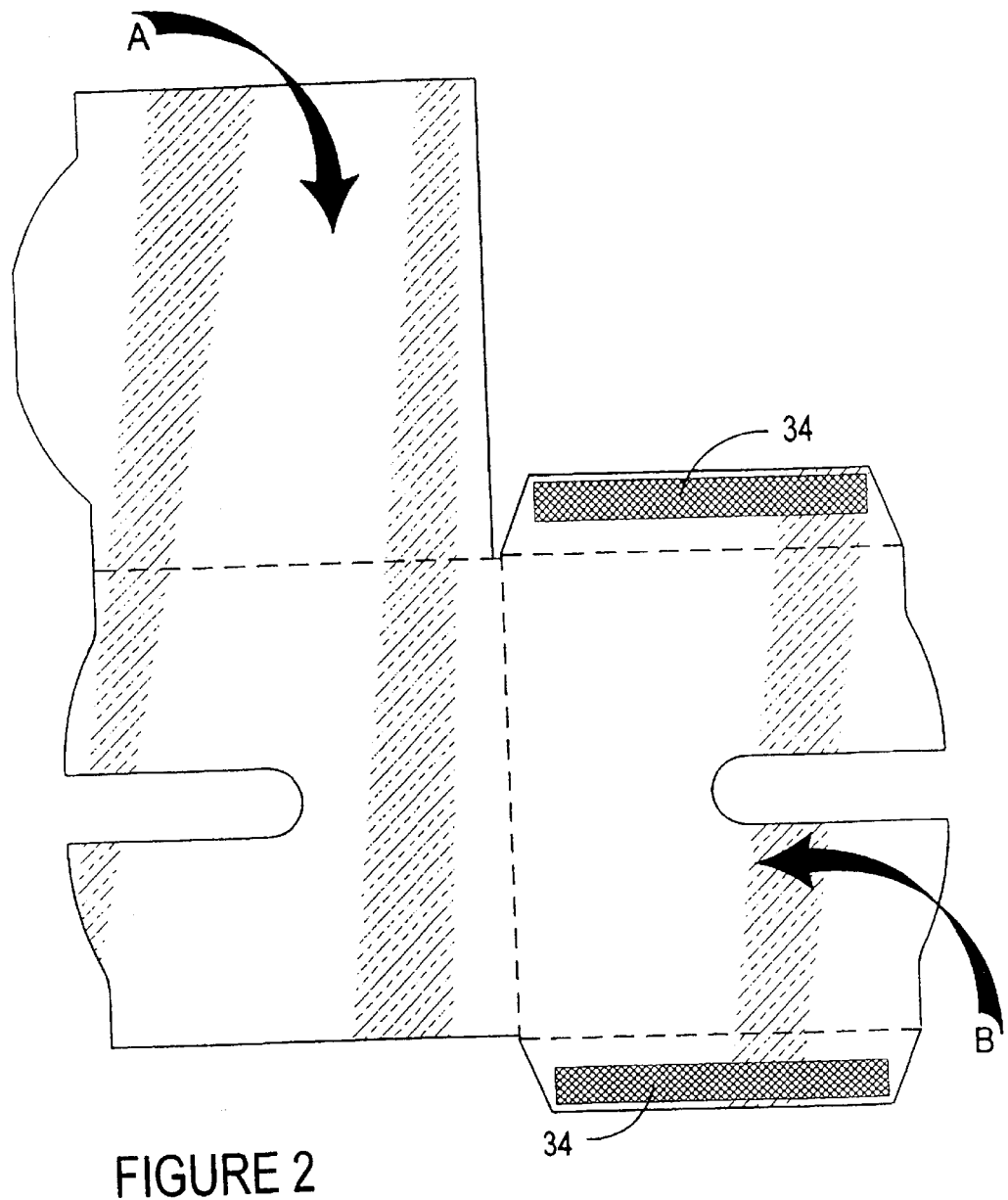
FIG. 2 is a plan view of the blank in FIG. 1, illustrating the folding process of the blank.

The construction of the carton is illustrated with reference to FIGS. 2 and 3: in this embodiment, glue 34 is first applied to securing flaps 22 and 26. Divider panel 14 is folded about fold line 16 in direction "A" and into face contacting relationship with back panel 12. Thereafter, front panel 18 is folded about fold line 20 in direction "B" and into face contacting relationship with the opposite face of divider panel 14. Construction is completed by folding securing flaps 22 and 26 about fold lines 24 and 28 respectively into face contacting relationship with the side portions of the outer face of back panel 12 to be secured together by the glue or other means known in the art.

One advantage of the present invention, is that the carton can be formed by a series of sequential folding and gluing operations which can take place in a straight line machine so that the carton is not required to be rotated or inverted to complete its construction. This reduces the time taken to construct a carton. The folding process is not limited to that described below and can be altered according to the particular manufacturing requirements.

Thus, the carton in its completed form is to be supplied to the user so that it can be adapted to provide a sleeve for discs or other like objects. FIG. 3 shows a sleeve for holding information discs comprising a back panel 12, a partition panel 14 foldably connected to an edge of back panel 12, a front panel 18 foldably connected to a second edge of the back panel 12. The partition panel 14 and the front panel 18 are folded upon the back panel 12 one after the other to form an envelope 40 with two disc pockets 42.

Figure 3:
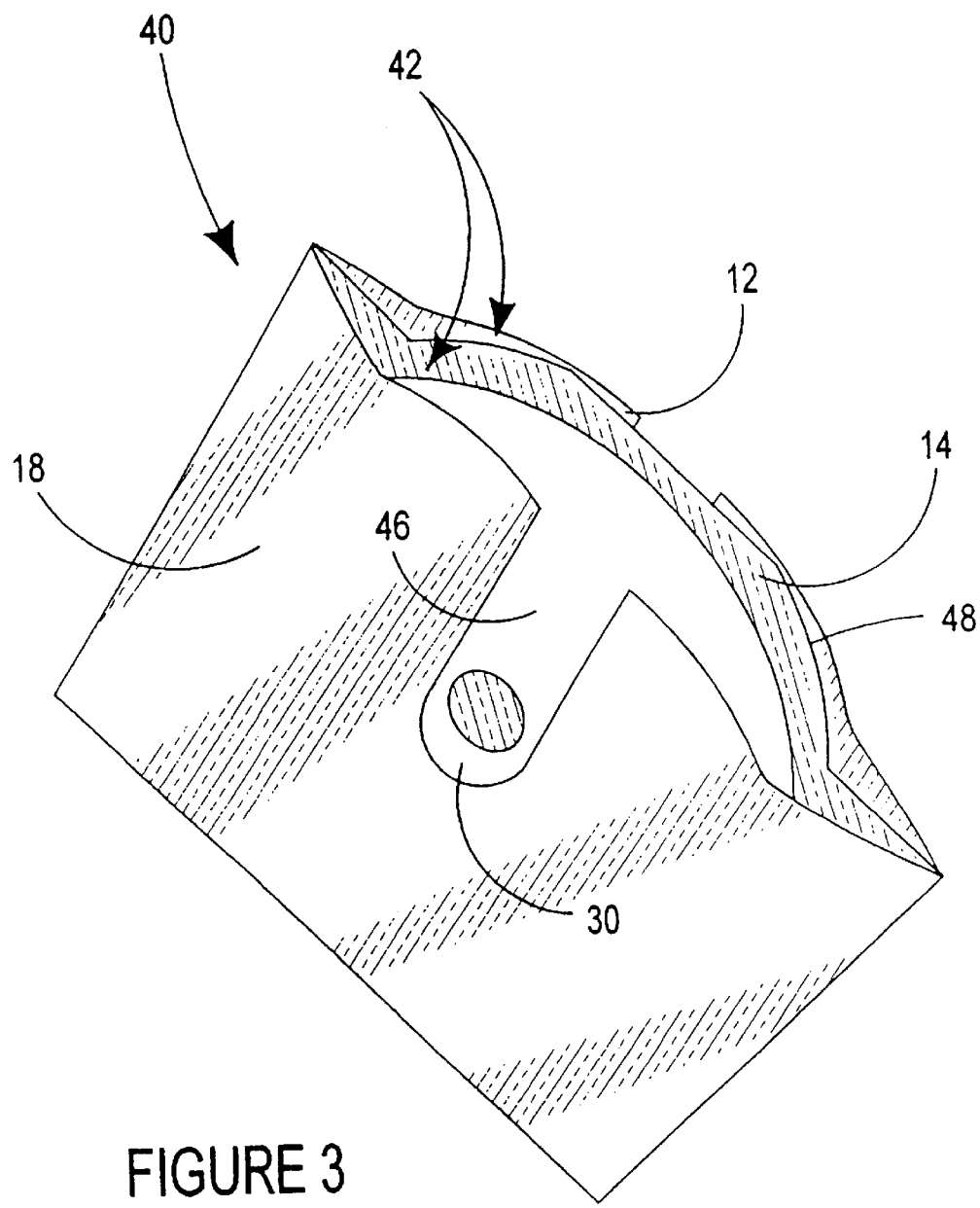
FIG. 3 is an isometric view of the sleeve formed from the blank illustrated in FIG. 1.

It can be seen from FIG. 3, that a disc 46 can be removed from the disc pockets 42 by using the recess 30 to retrieve the disc from the pockets. Furthermore, the protrusion 32 provides a protective outer edge 48 above the disc, so that it is the edge rather than the disc that makes contact with a surface if dropped. In this embodiment, the diameter of the disc is greater than the height of the front and back panels to aid removal of the disc.

Figure 4:
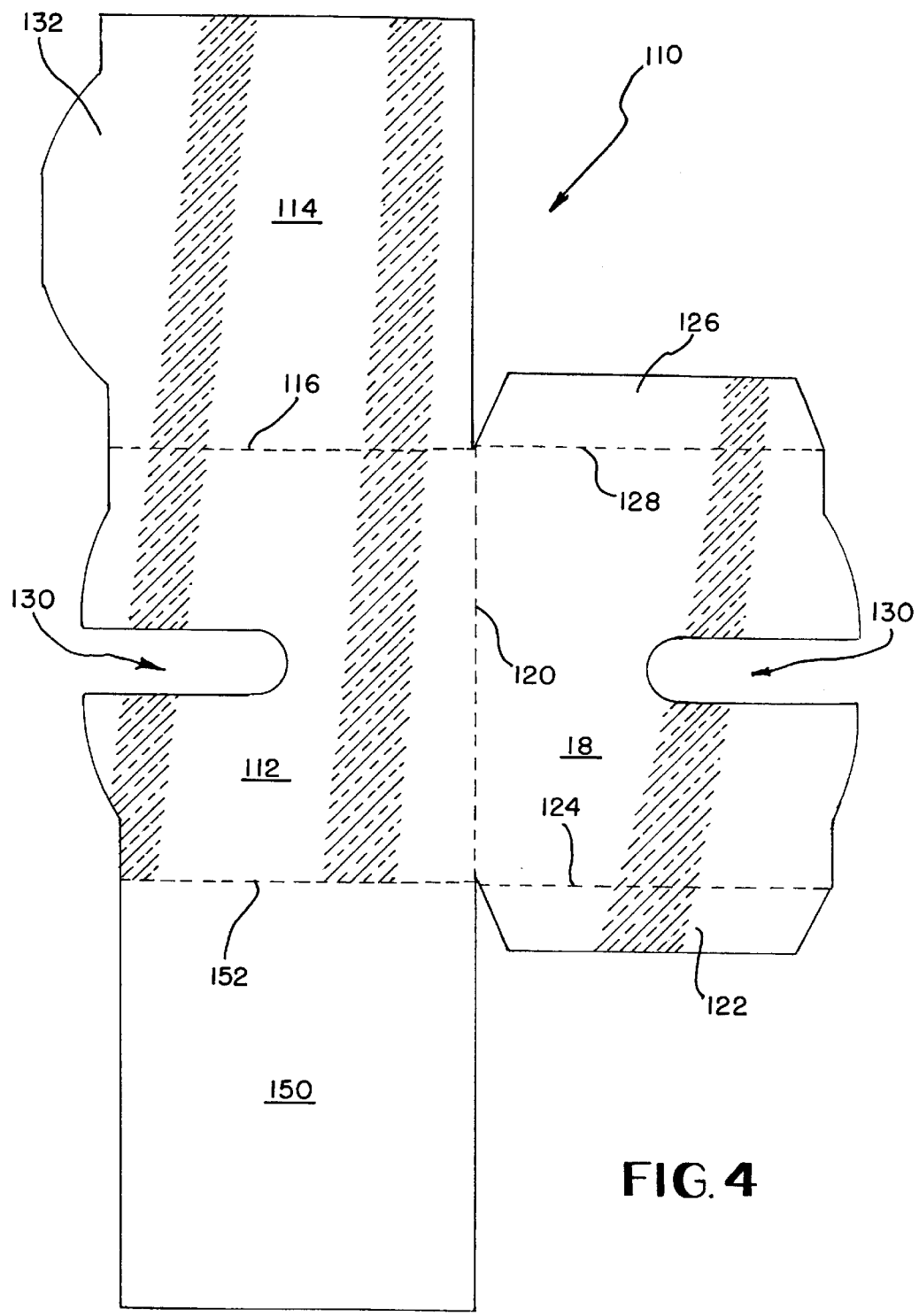
FIG. 4 is a plan view of a blank for forming a sleeve of an alternative embodiment according to the invention.

FIG. 4 illustrates a blank for forming a sleeve of the second embodiment according to the present invention. The blank 110 differs from that of FIG. 1 in that it has a second partition panel 150 that is foldably connected to the other side edge 152 of the back panel 112. In a set up condition, the second partition panel 150 is disposed between the first partition panel 114 and the front panel 118 to define a third disc pocket between the first and second partition panels 114 and 150.

Beneficially, the embodiments of the invention hereinbefore described provides a structure that it sufficiently strong to retain articles and to provide an integral base. The use of paperboard material provides an "environmentally friendly" alternative to sleeves formed from plastic material and the sleeves made from paperboard can include printed matter for marketing purposes.

It will be recognized that as used herein, directional references such as "top", "base", "end", and "side" do not limit the respective panels to such orientation but merely save to distinguish these panels from one another. Any reference to hinged connection should not be construed as necessarily referring to a single fold line only: indeed it is envisaged that hinged connection can be formed from one or more of one of the following, a score line, a frangible line or a fold line, without departing from the scope of invention.

The present invention and its preferred embodiments relate to a carton or a sleeve which is shaped to provide satisfactory rigidity to hold items such as compact discs with a degree of flexibility. The shape of the blank minimizes the amount of paperboard required for the carton. The carton can be constructed from a flat collapsed condition to a position of use by hand or automatic machinery. It is anticipated the invention can be modified, for example two or more divider panels can be attached to the blank to define a plurality of disc pockets 42, without departing from the scope of the invention For example, the front and back panels could be a polygonal form, e.g. hexagon, and each side edge of the back panel could be connected to a partition panel foldable to provide a sleeve with multiple disc pockets.

What is claimed is:

1. A sleeve comprising a back panel having front and rear opposed faces, a first partition panel foldably connected to one of opposite side edges of the back panel, and a front panel foldably connected to a bottom edge of the back panel, wherein the first partition panel is folded and disposed over the front face of the back panel to define a first pocket between the back panel and the first partition panel, the front panel is folded and disposed over the first partition panel to define a second pocket between the partition panel and the front panel as well as to provide a closed bottom for both the first and second pockets, and wherein the front panel comprises a pair of securing flaps secured to the rear face of the back panel to retain the first partition panel and the front panel in respective folded positions.

2. The sleeve as claimed in claim 1 wherein the securing flaps are hingedly connected respectively to opposite side edges of the front panel.

3. The sleeve as claimed in claim 1 wherein at least one of the front and back panels has a recess opening to a top edge thereof.

4. The sleeve as claimed in claim 1 wherein the first partition panel comprises a protrusion extending therefrom.

5. The sleeve as claimed in claim 1 further comprising a second partition panel foldably connected to the other side edge of the back panel, the second partition panel is disposed between the first partition panel and the front panel.

6. A method of forming a sleeve with two or more pockets from a blank including a back panel having front and rear opposed faces, a partition panel foldably connected to one of the opposed side edges of the back panel, a front panel foldably connected to a bottom edge of the back panel, and a pair of securing flaps hingedly connected respectively to opposed side edges of the front panel, the method comprising the steps of (i) folding the partition panel into face contacting arrangement with the front face of the back panel; (ii) folding the front panel about the bottom edge of the back panel into face contacting arrangement with the partition panel; (iii) folding the securing flaps into face contacting arrangement with the rear face of the back panel; and (iv) securing the securing flaps to the rear face of the back panel to retain the partition panel and the front panel in respective folded positions.

* * * * *